(12) United States Patent
Braun et al.

(10) Patent No.: US 9,223,136 B1
(45) Date of Patent: Dec. 29, 2015

(54) PREPARATION OF IMAGE CAPTURE DEVICE IN RESPONSE TO PRE-IMAGE-CAPTURE SIGNAL

(71) Applicant: Google Inc., Mountain View, CA (US)

(72) Inventors: Max Benjamin Braun, San Francisco, CA (US); Peter Kenneth Malkin, Mountain View, CA (US); Sergey Brin, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 222 days.

(21) Appl. No.: 13/758,888

(22) Filed: Feb. 4, 2013

(51) Int. Cl.
*G09G 5/00* (2006.01)
*G02B 27/01* (2006.01)

(52) U.S. Cl.
CPC .................................. *G02B 27/017* (2013.01)

(58) Field of Classification Search
None
See application file for complete search history.

(56) References Cited

U.S. PATENT DOCUMENTS

| | | | | |
|---|---|---|---|---|
| 4,460,264 | A * | 7/1984 | Winter | 396/165 |
| 5,309,195 | A * | 5/1994 | Goo et al. | 396/302 |
| 2008/0192114 | A1* | 8/2008 | Pearson et al. | 348/81 |
| 2009/0189974 | A1* | 7/2009 | Deering | 348/46 |
| 2009/0262205 | A1* | 10/2009 | Smith | 348/211.4 |
| 2009/0295731 | A1 | 12/2009 | Kim et al. | |
| 2009/0303199 | A1 | 12/2009 | Cho et al. | |
| 2010/0118154 | A1* | 5/2010 | Lee | 348/208.4 |
| 2011/0111769 | A1 | 5/2011 | Yeon | |
| 2011/0238676 | A1 | 9/2011 | Liu et al. | |
| 2013/0106681 | A1* | 5/2013 | Eskilsson et al. | 345/156 |
| 2014/0046400 | A1* | 2/2014 | Roy et al. | 607/54 |
| 2014/0063055 | A1* | 3/2014 | Osterhout et al. | 345/633 |
| 2014/0152539 | A1* | 6/2014 | Cai et al. | 345/156 |

FOREIGN PATENT DOCUMENTS

WO    WO2013066334 A1 * 10/2013

* cited by examiner

*Primary Examiner* — Grant Sitta
*Assistant Examiner* — Kirk Hermann
(74) *Attorney, Agent, or Firm* — McDonnell Boehnen Hulbert & Berghoff LLP

(57) ABSTRACT

Embodiments may be implemented by a computing device, such as a head-mountable display or mobile phone, in order to pre-emptively warm up the device's camera, when it is probable that a user will be taking a photo. An illustrative method involves a computing device (a) receiving sensor data from one or more sensors associated with the computing device, wherein the computing device comprises an image-capture device, (b) analyzing the sensor data to detect at least one pre-image-capture signal, wherein the at least one pre-image-capture signal indicates a subsequent image-capture signal is likely to be received, and (c) in response to detecting the at least one pre-image-capture signal, causing the computing device to initiate an image-capture preparation process that prepares the image-capture device to capture an image.

18 Claims, 11 Drawing Sheets

PREPARATION OF IMAGE CAPTURE DEVICE IN RESPONSE TO PRE-IMAGE-CAPTURE SIGNAL

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

In one aspect, a computing device may include an image-capture device and a control system configured to: (a) receive sensor data from one or more sensors; (b) analyze the sensor data to detect at least one pre-image-capture signal that indicates a subsequent image-capture signal is likely to be received; and (c) in response to detection of the at least one pre-image-capture signal, initiate an image-capture preparation process that prepares the image-capture device to capture an image.

In another aspect, a computer-implemented method may involve: (a) receiving sensor data from one or more sensors associated with a computing device, wherein the computing device comprises an image-capture device; (b) analyzing the sensor data to detect at least one pre-image-capture signal, wherein the at least one pre-image-capture signal indicates a subsequent image-capture signal is likely to be received; and (c) in response to detecting the at least one pre-image-capture signal, causing the computing device to initiate an image-capture preparation process that prepares the image-capture device to capture an image.

In a further aspect, a non-transitory computer readable medium has stored therein instructions that are executable by a computing device to cause the computing device to perform functions including: (a) receiving sensor data from one or more sensors associated with a computing device, wherein the computing device comprises an image-capture device; (b) analyzing the sensor data to detect at least one pre-image-capture signal, wherein the at least one pre-image-capture signal indicates a subsequent image-capture signal is likely to be received; and (c) in response to detecting the at least one pre-image-capture signal, causing the computing device to initiate an image-capture preparation process that prepares the image-capture device to capture an image.

These as well as other aspects, advantages, and alternatives will become apparent to those of ordinary skill in the art by reading the following detailed description, with reference where appropriate to the accompanying drawings.

DETAILED DESCRIPTION

Figure 1A:
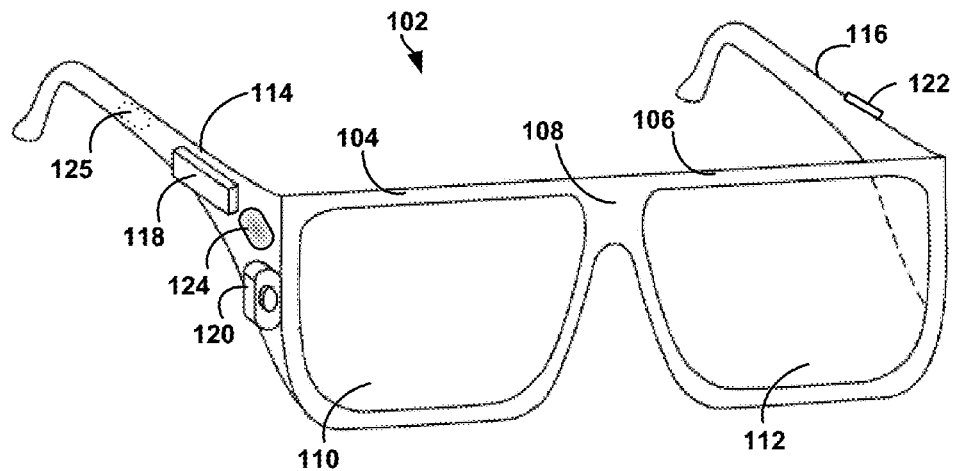
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Computing devices often provide a number of different functions, and may switch their mode of operation depending upon the particular function or functions of the device at a given point in time. For example, a mobile phone my provide a camera, a web-browsing interface, an e-mail client, and/or voice call functionality, among other possibilities.

Multi-function computing devices with cameras may take actions to conserve battery life when not being used as a camera, such as powering down components of the camera, for instance. Such computing devices may then prepare or "warm up" the camera when an instruction to enter a camera mode is received and/or when the user actually takes a picture by, e.g., pressing a shutter button.

In some cases, when a picture is taken on the release of the shutter button, the speed of the picture-taking process can be improved by warming up the camera when the shutter button is initially depressed (e.g., by taking certain warm-up actions when the button is engaged, rather than when the button is released). Example embodiments may help to improve upon this technique by warming up a camera in response to certain "pre-image-capture" signals, which might not definitively indicate that a user wishes to capture an image, but do indicate that a subsequent picture-taking action is possible or likely.

Some embodiments may involve a head-mountable device (HMD) preparing or "warming up" a point-of-view (POV) camera in response to a pre-image-capture signal, which indicates that a subsequent image-capture signal is likely to be received. For example, an HMD may allow a user to capture an image with an image-capture button. The image-capture button may be a physical button that is mechanically depressed and released, or a virtual button that is engaged by touching the user's finger to a touchpad. In such a configuration, the HMD may include one or more proximity sensors to detect when a user's finger is near to the image capture button and responsively warm up the camera. By doing so, the camera will be ready to capture an image if the user does, in fact, engage the image-capture button. Note, however, that the proximity of the user's finger to the image capture button does not definitively indicate that the user is going to take a picture. There may be instances where the camera is warmed up, but the user decides they don't want to take a picture and thus does not press the image capture button.

As another example, an HMD may include sensors that detect movements of the user's eye and/or face, and thus may allow a user to capture an image with an eye gesture, such as a wink. With such a configuration, the HMD may warm up its camera when a user closes their eye and/or when the HMD detects that the user is fixating (e.g., staring) at something. Both of these occurrences may be interpreted as pre-image-capture signals, which indicate that a user is likely about to wink to capture an image. Note that the HMD could additionally or alternatively use other sensors, such as an accelerometer, gyroscope, and/or magnetometer, to determine that the user is fixated on something.

As yet another example, an HMD may be configured to detect voice commands. In such an embodiment, the HMD may respond to a first voice command by switching to a camera mode where image capture is possible via a second voice command. For instance, a user might say "OK HMD," and then say "Take a Picture." The HMD may switch to a picture-taking mode in response to the phrase "OK HMD," and then take a picture in response to the phrase "Take a Picture." In such an embodiment, the HMD may interpret the first voice command (e.g., "OK HMD") as a pre-image-capture signal, and responsively warm up its camera so that it is ready to take picture in the event it subsequently detects the second voice command (e.g., "Take a Picture"). Further, note that receiving the "Take a Picture" voice command does not necessarily result in the HMD capturing an image, until the device switches to a mode where image capture is possible (e.g., in response to the "OK HMD" voice command).

It should be understood that the above embodiments and other described herein are provided for purposes of illustration, and are not intended to be limiting. Variations on the above embodiments and other embodiments are possible, without departing from the scope of the invention as set forth by the claims.

II. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
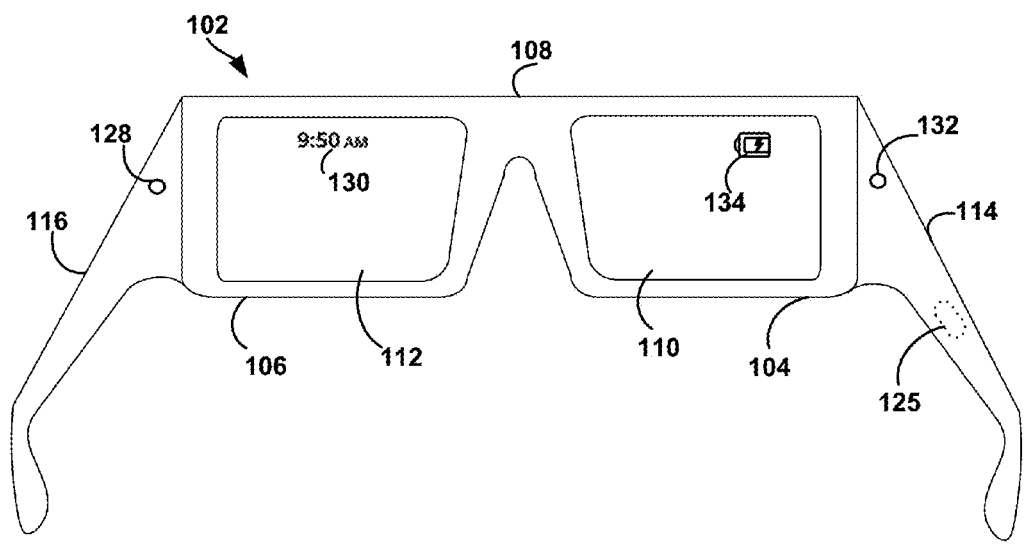
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
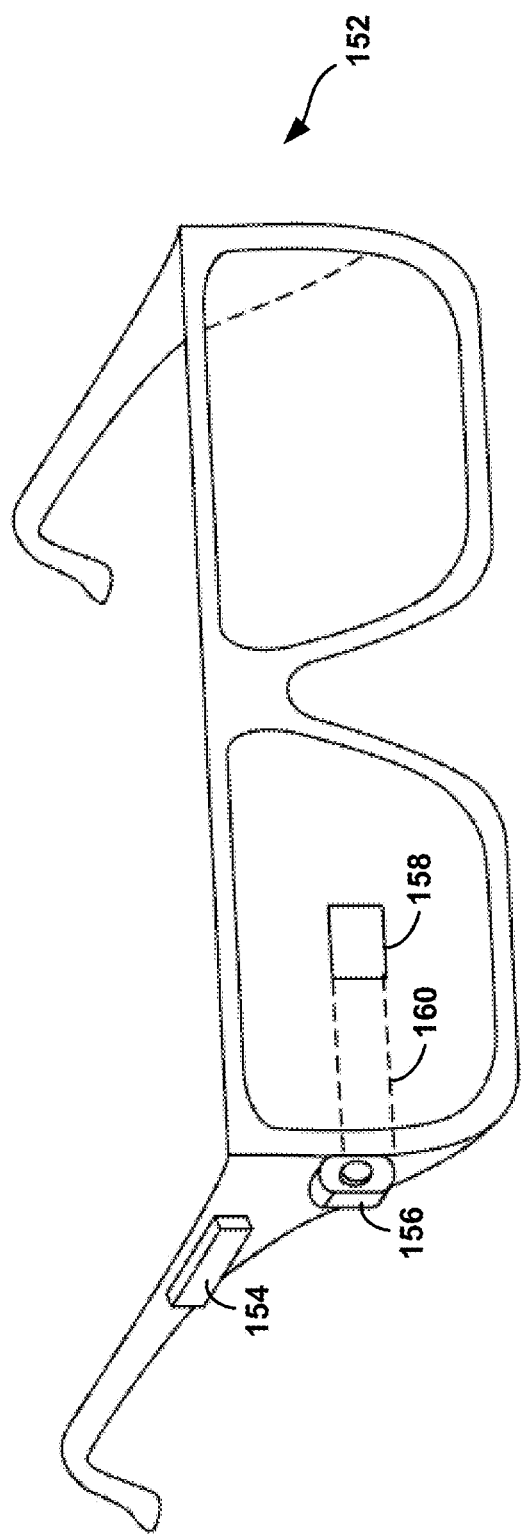
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
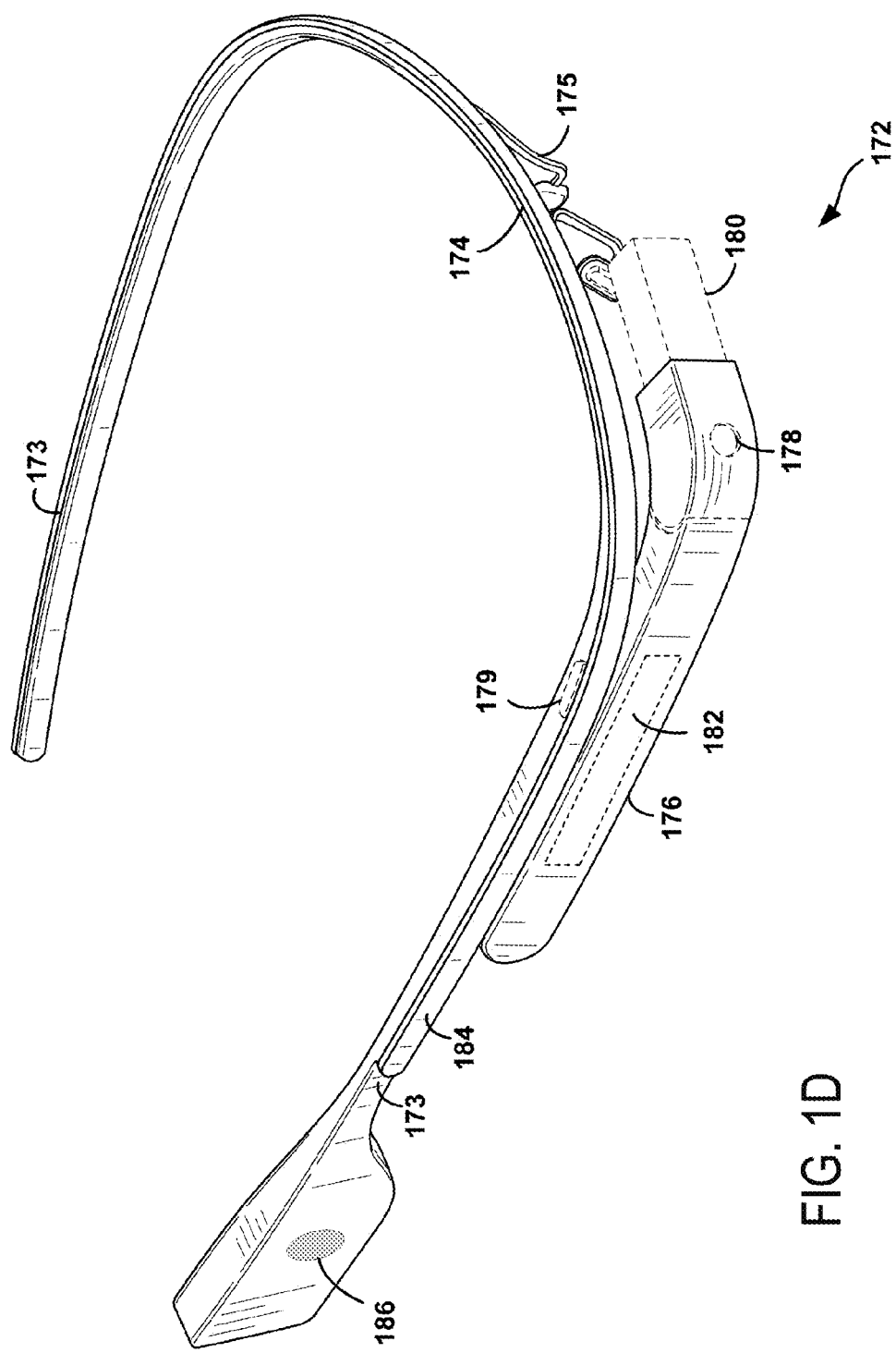
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
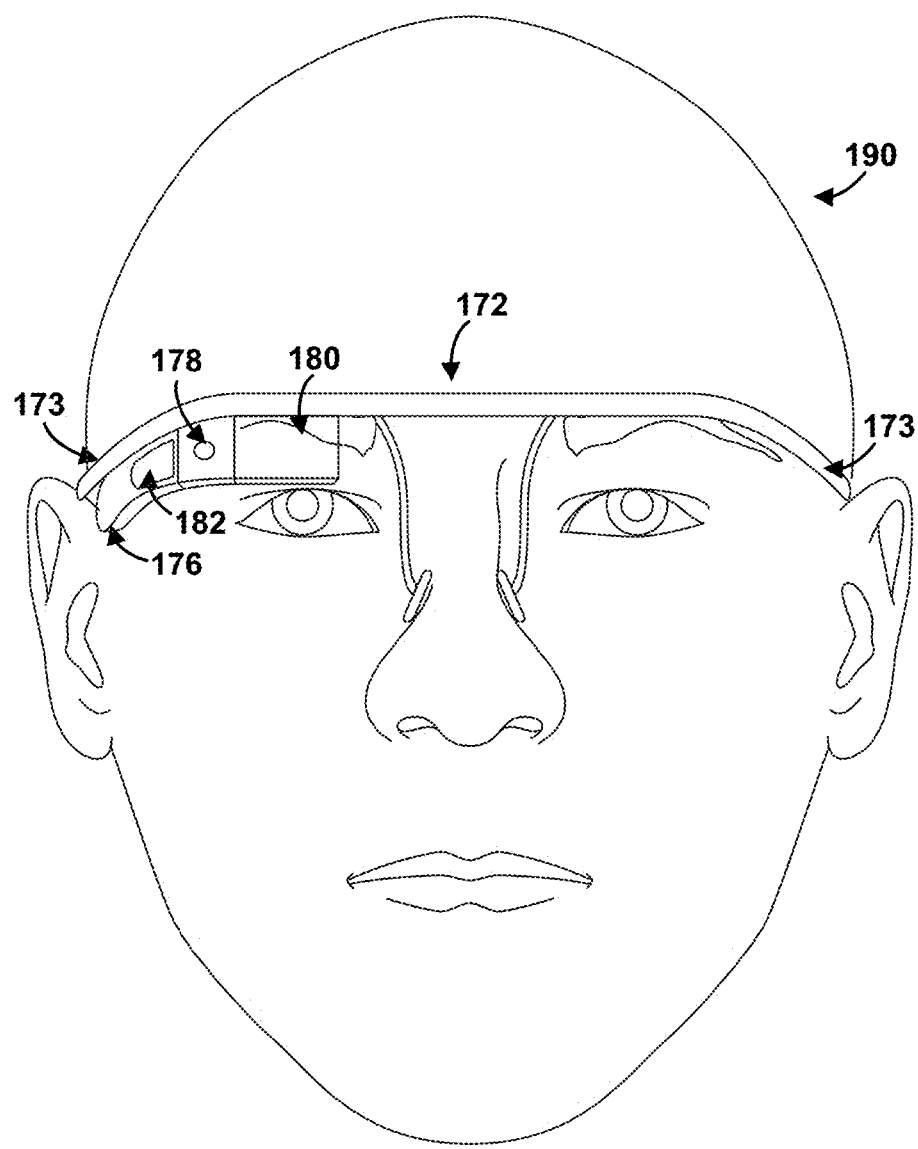
FIGS. 1E to 1G are simplified illustrations of the wearable computing system shown in FIG. 1D, being worn by a wearer.
Figure 1F:
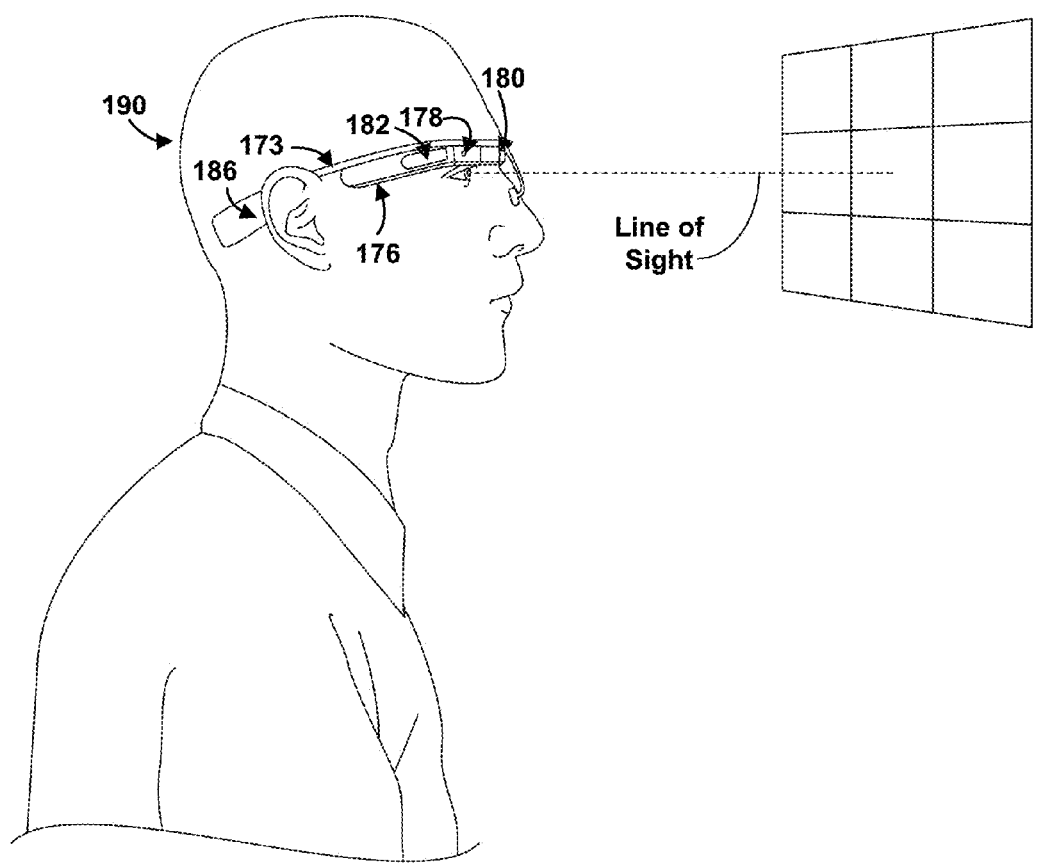
Figure 1G:
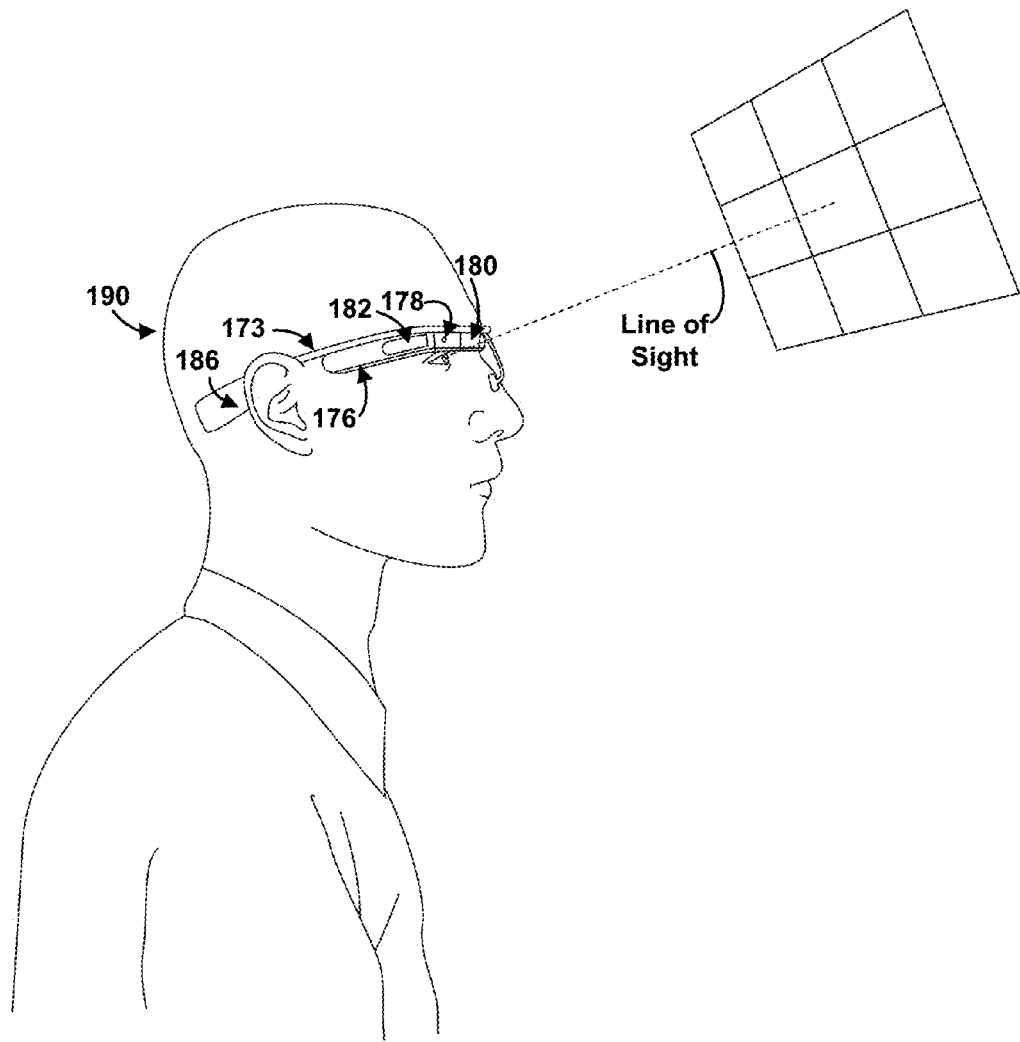

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
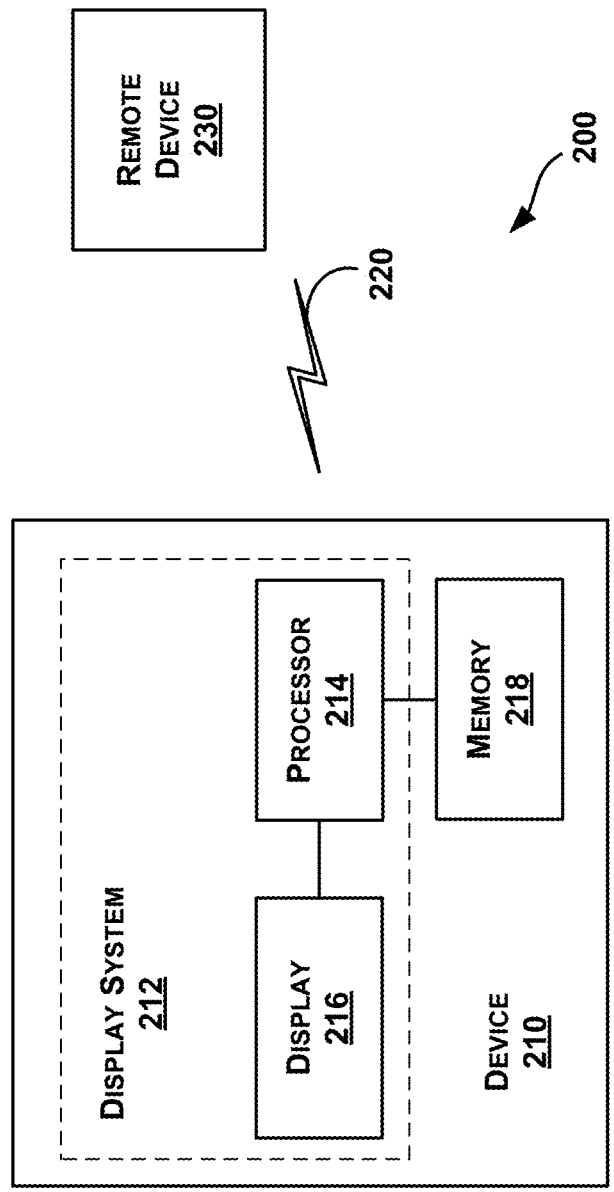
FIG. 2 is a simplified block diagram of a computing device according to an example embodiment.

FIG. 2 is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. Illustrative Methods

Figure 3A:
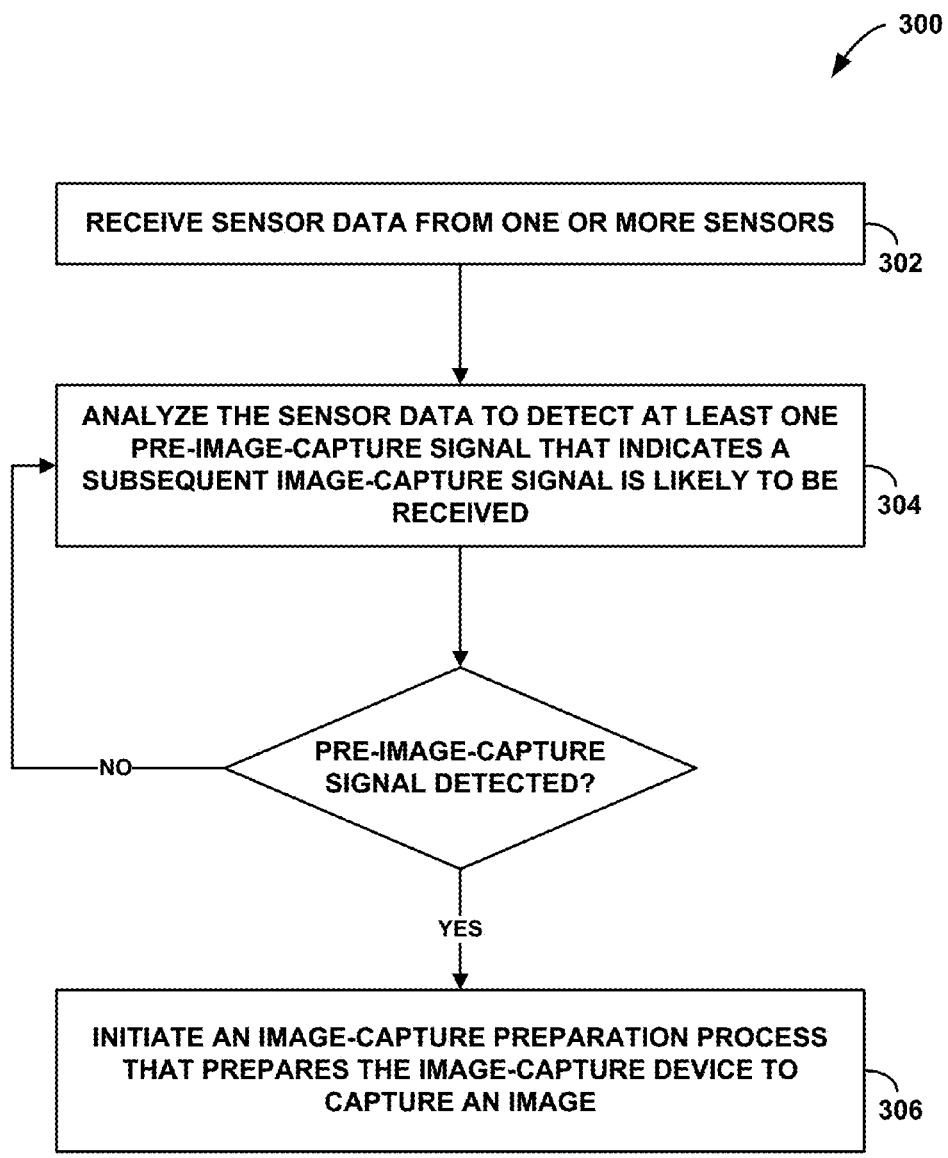
FIG. 3A is a flow chart illustrating a method, according to an example embodiment.

FIG. 3A is a flow chart illustrating a method 300, according to an example embodiment. Illustrative methods, such as method 300, may be carried out in whole or in part by an HMD, such as the head-mountable devices shown in FIGS. 1A to 1G. Method 300 is described by way of example as being carried out by an HMD; or in other words, by components of an HMD, such as a control system. Such a control system may include, for example, a processor and program instructions stored on a non-transitory computer-readable medium. However, an HMD's control system may additionally or alternatively include other components. Further, an example method or portions thereof may be carried out by components of an HMD other than a control system. Yet further, an example method, or portions thereof, may be carried out by a computing device that is in communication with an HMD. An example method may also be carried out by other types of computing devices and/or combinations of computing devices, which include and/or are in communication with an image-capture device, without departing from the scope of the invention. Other examples of such computing devices include, but are not limited to, mobile phones, tablet computers, and stand-alone digital cameras.

As shown by block 302, method 300 involves an HMD receiving sensor data from one or more sensors. The HMD may analyze the sensor data to detect at least one pre-image-capture signal that indicates a subsequent image-capture signal is likely to be received, as shown by block 304. In response to detection of the at least one pre-image-capture signal the HMD may initiate an image-capture preparation process that prepares the image-capture device to capture an image, as shown by block 306.

In an example embodiment, the image-capture preparation process may involve various functions or combinations of functions. As examples, an image-capture preparation process may involve: (a) powering up a camera sensor, (b) powering up a camera chipset, (c) powering up internal cores of the HMD that run camera driver software, (d) pre-allocating memory buffers for the cameras functions, (e) establishing a connection (e.g., an OMX connection) between a main user-space core (such as that of the HMD's operating system) and the camera controller cores, and/or (f) setting default imaging parameters for the camera. Additionally or alternatively, the image-capture preparation process may involve initiating a camera preview process to acquire a stream of image frames from the camera. These images may then be used to carry out an auto-exposure process, an auto-focus process, and/or an automatic white-balancing process, among other possibilities. Further, such images might be used preview the scene in a viewfinder and/or LCD display.

Note that in some implementations, method 300 may involve the HMD receiving and/or analyzing sensor data on a continual basis. In other implementations, method 300 may involve the HMD receiving and/or analyzing sensor data periodically, from time to time, or even on a one-time basis.

In some implementations, an HMD may only initiate the image-capture preparation process when a certain combination of two or more pre-image capture signals are detected. For example, the HMD may only carry out block 306 and initiate the image-capture preparation process, in response to detecting both a first and a second pre-image capture signal at block 304. Other examples are also possible.

In some implementations, the at least one pre-image-capture signal may indicate a probability of receiving a subsequent image-capture signal within a certain period of time. As such, method 300 may further involve the HMD determining a probability of a subsequent image-capture signal, and initiating an image-capture preparation process when the probability of subsequent image capture is greater than some threshold probability. To do so, the HMD may analyze one or more pre-image-capture signals in order to determine the probability of a subsequent image-capture signal.

Figure 3B:
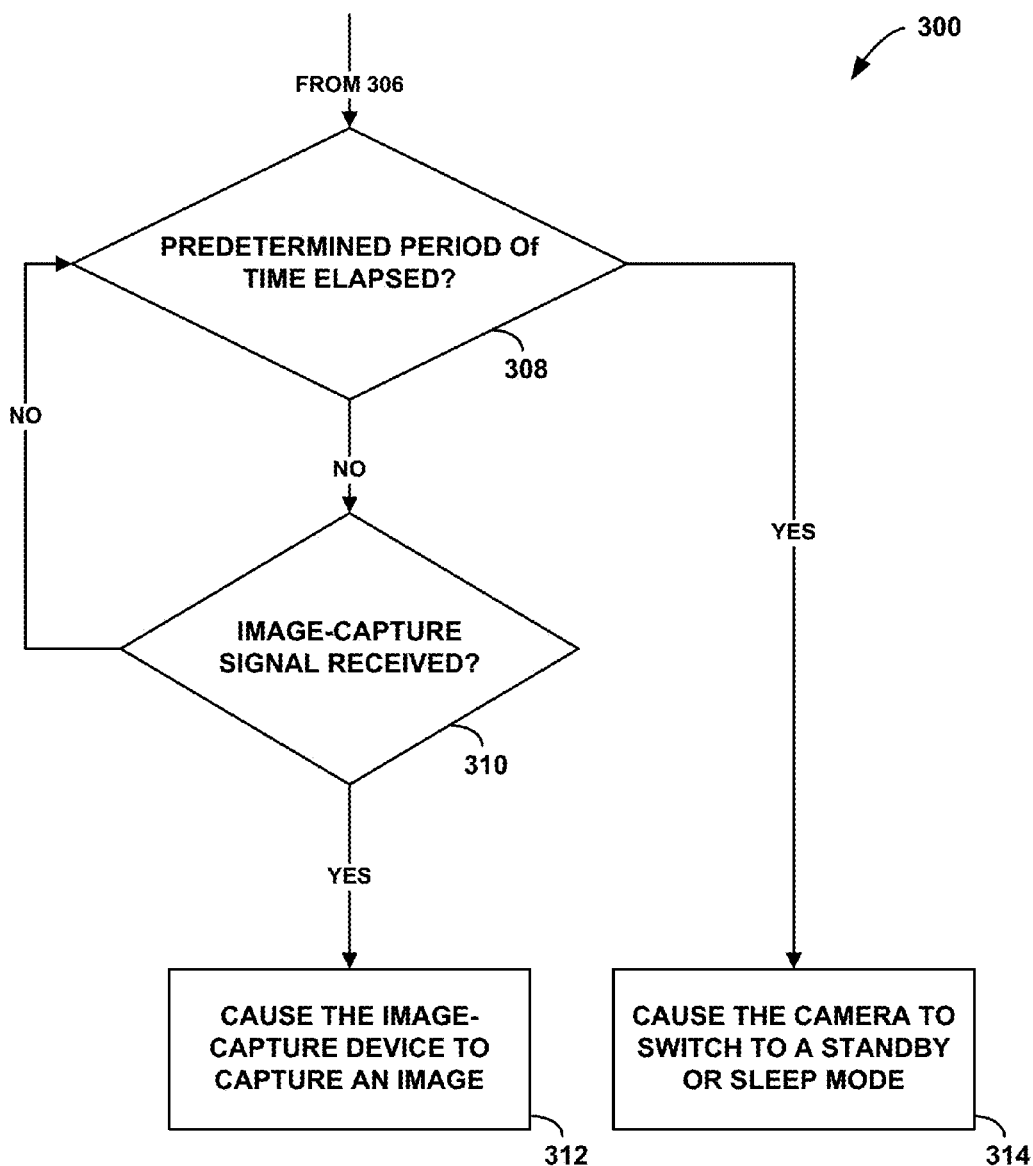
FIG. 3B is a flow chart illustrating another method, according to an example embodiment.

FIG. 3B is a flow chart illustrating another method 350, according to an example embodiment. Method 350 may be carried out subsequent to initiating the image-capture preparation process at block 306.

More specifically, in many cases, it is expected that the user will decide to take a picture shortly after the pre-imagecapture signal is detected. As such, the HMD wait for a predetermined period of time, after receiving a pre-image-capture signal, for a subsequent image-capture signal to be received, as shown by blocks 308 and 310. During this period, HMD may cause the image-capture device to remain prepared to capture an image. For example, carrying out the image-capture preparation process may place a camera in an "image-ready" state. Accordingly, the HMD may keep the camera in this image-ready state until either (a) an image-capture signal is received or (b) a predetermined period of time elapses without receipt of an image-capture signal. In some cases, the HMD receive an image-capture signal during this period. In such case, the HMD may cause the image-capture device to capture an image, as shown by block 312.

In some cases, the user might decide against capturing an image. In such case, the predetermined period of time may elapse without receipt of an image-capture signal, and the HMD may no longer cause the image-capture device to remain in the image-ready mode. For example, the HMD may cause the camera to switch to a standby or sleep mode, as shown by block 314. In particular, the HMD might (a) power down a camera sensor, (b) power down a camera chipset, (c) power down internal cores of the HMD that are running the camera driver software, (d) release memory that was being used for cameras functions, and/or (e) tear down the connection between the main user-space core and the camera controller cores, among other possibilities.

IV. Illustrative Applications

Example applications of methods 300 and 350 will now be described with reference to different user-interfaces via which images may be captured. It should be understood, however, that the below applications of methods 300 and 350 are not intended to be limiting.

A. Wink to Capture an Image

In some embodiments, an HMD may allow for a wearer of the HMD to capture an image by winking, or carrying out some other kind of eye gesture. As such, the HMD may include one or more types of sensors to detect when the wearer winks and/or performs other eye gestures (e.g., a blink, a movement of the eye-ball, and/or a combination of such eye movements). For example, the HMD may include one or more inward-facing proximity sensors directed towards the eye, one or more inward-facing cameras directed towards the eye, one or more inward-facing light sources (e.g., infrared LEDs) directed towards the eye and one or more corresponding detectors, among other possible sensor configurations for an eye-tracking system (which may also be referred to as a "gaze-tracking system"). Some examples of such an eye-tracking system are described in greater detail below in Section VI.

In a wink-to-capture-an-image embodiment, the pre-image-capture signal that is detected at block 304 may include or take the form of sensor data that corresponds to a closed eye. In particular, the HMD may analyze data from an eye-tracking system to detect data that is indicative of a wearer closing their eye. This may be interpreted as an indication that the wearer is in the process of winking to capture an image, as closing one's eye is an initial part of the larger action of winking.

In a wink-to-capture-an-image embodiment, the pre-image-capture signal, which is detected at block 304, may also include or take the form of sensor data that corresponds to fixation on a location in an environment of the computing device. In particular, there may be times when an HMD wearer stares at a subject before capturing an image of it. The wearer may do so in order to frame the image and/or while contemplating whether the subject is something they want to capture an image of, for example. Accordingly, the HMD may interpret eye-tracking data that indicates a wearer is fixating (e.g., staring) at a subject as being an indication that the user is about to or is likely to take an action, such as winking, to capture an image of the subject.

The HMD could also interpret data from one or more motion and/or positioning sensors as being indicative of the wearer fixating on a subject. For example, sensor data from sensors such as a gyroscope, an accelerometer, and/or a magnetometer may indicate motion and/or positioning of the HMD. An HMD may analyze data from such sensors to detect when the sensor data indicates that the HMD is undergoing motion (or substantial lack thereof) that is characteristic of the user staring at an object. Specifically, when an HMD is worn, a lack of movement by the HMD for at least a predetermined period of time may indicate that the HMD wearer is fixating on a subject in the wearer's environment. Accordingly, when such data is detected, the HMD may deem this to be a pre-image-capture signal, and responsively initiate an image-capture preparation process to prepare its camera to capture an image.

Further, in some embodiments, image data from a point-of-view camera may be analyzed to help detect when the wearer is fixating on a subject. In particular, a forward-facing camera may be mounted on an HMD such that when the HMD is worn, the camera is generally aligned with the direction that the wearer's head is facing. Therefore, image data from the camera may be considered to be generally indicative of what the wearer is looking, and thus can be analyzed to help determine when the wearer is fixating on a subject.

Yet further, a combination of the techniques may be utilized to detect fixation by the wearer. For example, the HMD may analyze eye-tracking data, data from motion sensors, and/or data from a point-of-view camera to help detect when the wearer is fixating on a subject. Other examples are also possible.

As noted above, in some implementations, an HMD may only initiate the image-capture preparation process when a certain combination of two or more pre-image capture signals are detected. For example, an HMD that provides wink-to-capture-an-image functionality might initiate an image-capture preparation process when it detects both (a) fixation on a subject by the wearer and (b) closure of the wearer's eye. Other examples are also possible.

As further noted above, an HMD may determine a probability of a subsequent image-capture signal, and only initiate the image-capture preparation process when the probability of subsequent image capture is greater than a threshold. For example, the HMD could associate a certain probability with the detection of a particular pre-image-capture signal or the detection of a certain combination of pre-image-capture signals. Then, when the HMD detects such a pre-image-capture signal or such a combination of pre-image-capture signals, the HMD may determine the corresponding probability of a subsequent image capture. The HMD can then compare the determined probability to a predetermined threshold in order to determine whether or not to initiate the image-capture preparation process.

As a specific example, an HMD that provides wink-to-capture-an-image functionality might determine that the probability of a subsequent image capture is equal to 5% when eye closure is detected. Similarly, the HMD could determine that the probability of a subsequent image capture is equal to 12% when fixation on a subject is detected. Further, the HMD might determine that the probability of a subsequent image capture is equal to 65% when fixation on a subject and an eye closure are both detected. The determined probability of a subsequent image capture could then be compared to a predetermined threshold (e.g., 40%) in order to determine whether or not to initiate the image-capture preparation process.

B. Voice Command to Take a Photo

In some embodiments, an HMD may be configured such that users can interact with and operate the HMD using voice commands. Accordingly, voice commands may be used for various functions related to photography and/or videography. As examples, the HMD may recognize voice commands that allow a user to open a camera application, zoom in or out, capture an image, switch between a picture mode and a video mode, start and stop the recording of a video, crop an image, adjust the brightness of an image, adjust the white balance of an image, and so on. Many other examples are also possible.

In some embodiments, a first voice command may cause an HMD to operate in an image-capture mode. In particular, if the first voice command is received while the HMD is not operating in the image-capture mode, then the HMD may switch to the image-capture mode. While operating in in the image-capture mode, the HMD may be configured to respond to a second voice command by causing the image-capture device to capture an image. For example, if the HMD has an e-mail application open when the HMD receives the first voice command, the HMD may responsively open a camera application. Once the camera application is open, the HMD may respond to a second voice command by causing the image-capture device to capture an image.

Note that before the HMD switches to the image-capture mode, the HMD may not be available to the user to capture an image. Rather, if the HMD detects while it is not in an image-capture mode, the HMD may do nothing (i.e., ignore the second command), or in some operating modes, might interpret the second voice command as providing some other kind of input.

Since the first voice command places the HMD in a state where image capture is possible via the second voice command, the HMD may interpret the first voice command as a pre-image-capture signal, and respond to receipt of the first voice command by initiating the image-capture preparation process. As such, the HMD camera may be warmed up so that an image can be captured more quickly, in the event that the HMD receives the second voice command.

Herein, an image-capture mode should be understood to be any mode of operation in which a second voice command is available to the user in order to capture an image. To illustrate, consider an implementation where a user has given their HMD a name so that the user may address the HMD in voice commands. This example will use the HMD name "Tom," but it should be understood that a device could be associated with almost any name. As such, an "OK Tom" voice command may be interpreted as a general voice command or cue to listen for a subsequent specific voice command or cue. More specifically, the "OK Tom" voice command may place the HMD in a mode where the HMD can recognize a number of different voice commands that are mapped to a number of different functions. The voice commands that may be recognized after the HMD receives the "OK Tom" voice command may include a "take a picture" voice command. The HMD may respond to the "take a picture" voice command by causing its camera to take a picture. Since receipt of the "OK Tom" voice command places the HMD in a state where the "take a picture" command is mapped to an image-capture function, the HMD may interpret the "OK Tom" voice command as a pre-image-capture signal, and respond to receipt of the "OK Tom" voice command by initiating an image-capture preparation process.

In some cases, operating in an image-capture mode may involve a computing device displaying a camera interface on its display. For instance, an HMD could display crosshairs, an image frame, information related to the cameras settings, and/or other graphics to indicate that image capture is possible. Additionally or alternatively, the HMD might play an audio indication to indicate that the HMD is in a mode where image capture is possible.

In other cases, there may be no explicit indication when a computing device switches to and/or is operating in an image-capture mode. For example, in the above example, when an HMD receives an "OK Tom" command, the HMD may simply listen for a subsequent voice command that indicates a particular action that should be taken, without providing any explicit visual or audible indication to the user that it is doing so. Other examples in which there is no explicit indication of the computing device operating in an image-capture mode are also possible.

Other types of pre-image-capture signals and/or combinations of pre-image-capture signals may also indicate a likelihood that an image-capture voice command will be subsequently received. For example, the pre-image-capture signal may also include or take the form of sensor data that corresponds to fixation on a location in an environment of the computing device. Specifically, as described above, the HMD may interpret eye-tracking data, motion-sensor data, and/or image data that indicates a wearer is fixating on a subject as indicating that the user is about to or is likely to take an action to capture an image of the subject. As another example, the HMD might only initiate an image-capture preparation process when the HMD detects the combination of (a) fixation on a subject and (b) receipt of a general voice command that places the HMD in a state where an image-capture voice command is possible. Other examples are also possible.

C. Buttons and Other Touch-Based Interface Features to Take Photo

In some embodiments, an HMD may allow a user to capture an image with an image-capture button. The image-capture button may be a physical button that is mechanically depressed and released, such as button 179 of HMD 172, shown in FIG. 1D. An HMD may also include a virtual image-capture button that is engaged by touching the user's finger to a certain location on a touchpad interface. In either case, the HMD may operate its camera to capture in image when the wearer presses down on or contacts the image-capture button, or upon release of the button.

In such an embodiment, the pre-image-capture signal, which is detected at block 304, may also include or take the form of sensor data that is indicative of wearer's hand or finger being located near the image-capture button. Thus, block 306 may involve the HMD initiating the image-capture preparation process when it detects that the wearer's finger is near to or within a certain distance from the image-capture button. By doing so, the camera will be ready to capture an image if the user does, in fact, engage the image-capture button.

Accordingly, the HMD may include one or more sensors that are arranged to detect when a wearer's hand or finger is near to the image-capture button. For example, the HMD may include one or more proximity sensors and/or one or more cameras that are arranged to detect when a wearer's hand or finger is near to the image-capture button. Other sensors are also possible.

Figure 4:
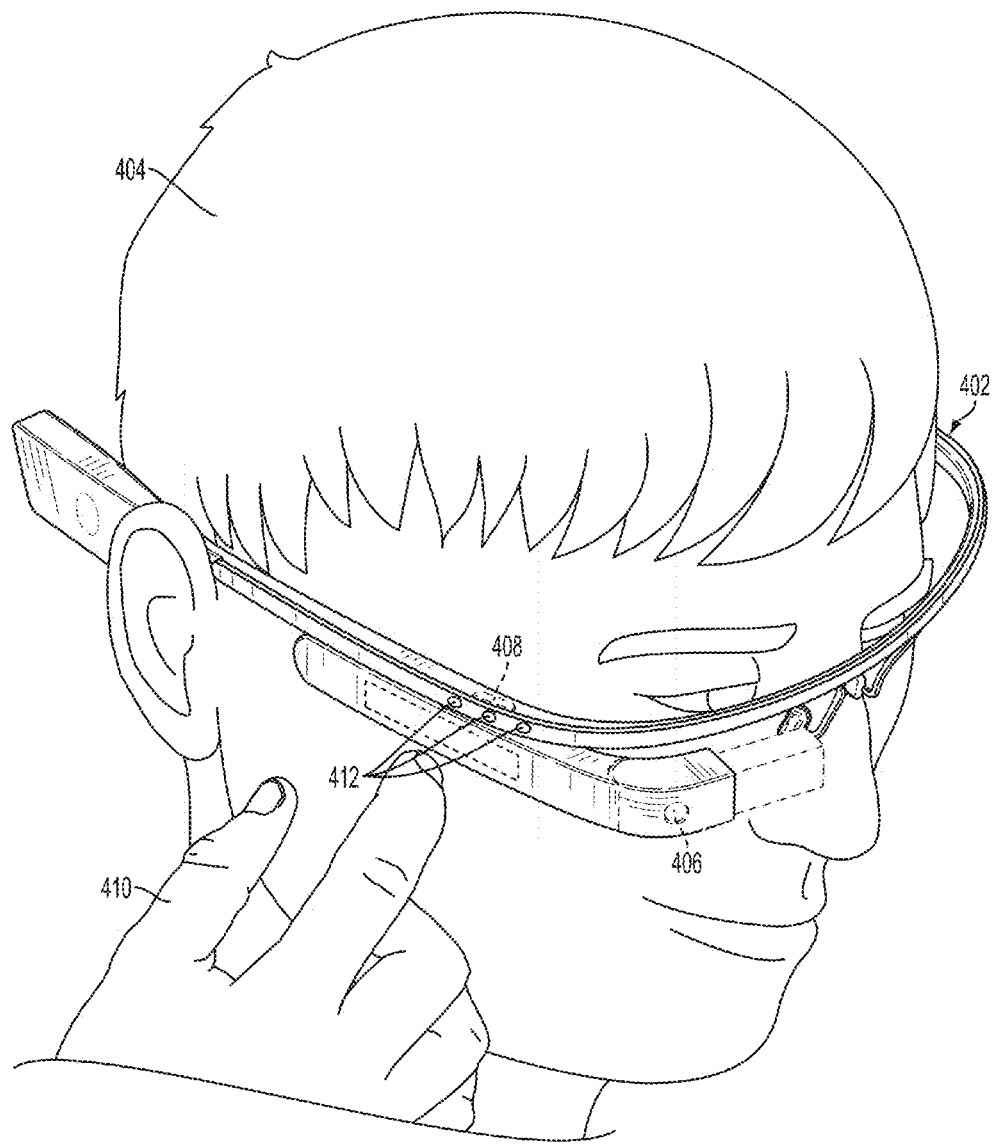
FIG. 4 is a simplified illustration of a scenario in which a head-mountable device is being worn by a wearer.

As a specific example, FIG. 4 is a simplified illustration of a scenario in which an HMD 402 is being worn by a wearer 404. As shown, HMD 402 includes a camera 406 and an image-capture button 408. The image-capture button 408 may be used by the wearer to capture an image with the camera 406. Note that the image-capture button 408 may be dedicated only to the function of capturing an image, or may have different functions, depending on the particular state of the HMD at a given point in time.

As shown in FIG. 4, the wearer 404 has positioned their hand 410 near to the image-capture button 408. As such, the proximity sensors 412, which are located on the frame of HMD 402, may detect the proximity of the wearer's hand to the image-capture button 408, and responsively prepare the camera 406 to take a picture.

In some embodiments, the HMD may determine whether a wearer's hand is "near to" an image-capture button, such that the HMD should initiate the image-capture preparation process, in a binary manner. That is, the HMD may analyze data from one or more proximity sensors or a camera and make a binary determination as to whether or not the wearer's hand is present. Then, if the wearer's is detected in the sensor data, then the HMD may warm up its camera.

In other embodiments, the HMD may determine a distance between the wearer's hand and the image-capture button, and start the image-capture preparation process only when the wearer's hand is within a certain distance of the image-capture button. For instance, referring to FIG. 4, the HMD 402 may analyze data from proximity sensors 412 to detect the presence of the wearer's hand 410 and/or to determine the distance between the wearer's hand 410 and the one or more proximity sensors 412. (Note that the placement of the one or more proximity sensors 412 may be such that the distance between the proximity sensors 412 and the wearer's hand 410 is considered to be an adequate approximation of the distance between the image-capture button 408 and the wearer's hand 410.) If the detection of a wearer's hand 410 within one inch or less from the proximity sensors 412 is considered to be a pre-image-capture signal, then the HMD 402 may initiate the image-capture preparation process if it detects, for example, that the wearer's hand 410 is a half inch from the proximity sensors 412.

Other types of pre-image-capture signals and/or combinations of pre-image-capture signals may also indicate a likelihood that an image-capture button will be subsequently engaged. For example, the pre-image-capture signal may also include or take the form of sensor data that corresponds to fixation on a location in an environment of the computing device. Specifically, as described above, the HMD may interpret eye-tracking data, motion-sensor data, and/or image data that indicates a wearer is fixating on a subject as indicating that the user is about to or is likely to take an action to capture an image of the subject. Other examples are also possible.

V. Short and Long Press Image-Capture Functionality

In a further aspect, some embodiments may implement the functionality described herein in conjunction with functionality that varies a camera's image-capture function according to the duration of an image-capture signal.

For example, an HMD may allow for a user to either take a photograph or record video, by varying the length of time for which a shutter or image-capture button is depressed. More specifically, an HMD may capture a still image when its image-capture button depressed and then then released within a predetermined period of time (with the image being captured upon release of the button). In other words, the HMD may take a photograph in response to a "short press" of the image-capture button. If, however, the user engages the image-capture button for more than the predetermined period of time, then the HMD may start recording a video with its camera (possibly without waiting for the user to release the button). In other words, the HMD may start recording video in response to a "long press" of the image-capture button.

In such an embodiment, the HMD may initiate an image-capture preparation process as described above in section IV(C), for example. Further, in the event that the image-capture preparation process has not been initiated by the time the wearer depresses the image-capture button, the HMD may initiate the image-capture preparation process in response to the user engaging the image capture button.

VI. Examples of Eye-Tracking Systems

As noted, an example computing device may include an eye-tracking system that may allow the device to, e.g., detect when a user winks and responsively capture an image. Further, in some embodiments, a computing device may use such an eye-tracking system to detect when a user closes their eye and responsively initiate an image-capture preparation process.

A. Eye-Tracking System with Proximity Sensors

Figure 5:
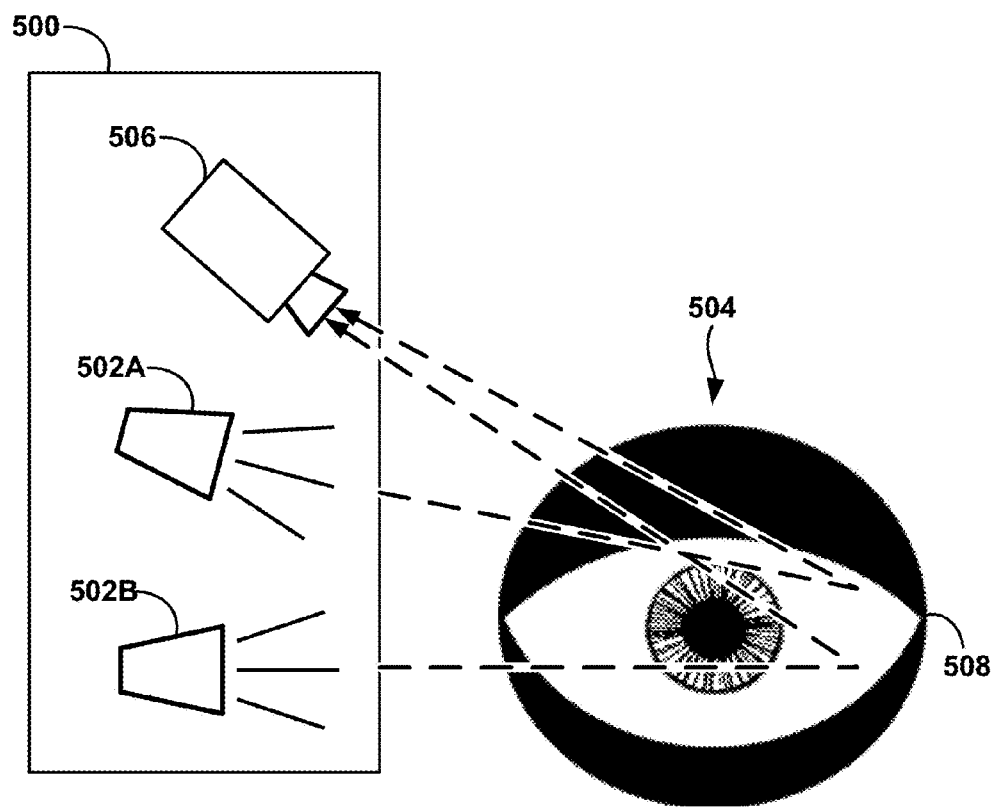
FIG. 5 illustrates an example of an eye-tracking system interacting with an eye area.

FIG. 5 illustrates an example of an eye-tracking system 500 interacting with an eye area 504. The eye area 504 can include the eye surface, eyelids, and portions of the face around the eye. The eye-tracking system 500 includes two light sources 502A and 502B that are configured to provide light (light shown as dashed lines) to the eye area 504, and a light sensor 506 that is configured to detect reflected light (also shown as dashed lines) from the eye area 504. The eye-tracking system can further include a processing unit (not shown in FIG. 5) that can perform computing functions. In particular, the processing unit can drive the light sources 502A-B, receive readings from the light sensor 506, process the readings to determine aspects of the eye area 504, or perform combinations of these functions, among other functions.

The eye-tracking system 500 is shown to use two light sources 502A-B to provide light to the eye area 504. While two light sources are shown, in general, an eye-tracking system can use any suitable number of light sources to illuminate the eye area. Further, some eye-tracking systems include no light sources. Instead, these systems can detect ambient light or other illumination coming from the eye area.

In systems using light sources, the light sources can be any type of light source. For example, the light sources can be light-emitting diodes (LEDs), laser diodes, incandescent sources, gas discharge sources, or combinations of these light sources, among other types of light sources. The light sources can be integrated with the system or externally connected to the system, and can be driven by a light sensor or a processing unit. The light sources can emit light of any suitable frequency or intensity. In an embodiment, the emitted light can have an intensity that is in a range that is safe for the user's eye. And the light can have a frequency that renders the light invisible to humans in order to avoid irritating the user. To this end, the light can be infrared light, near-infrared light, or the like. Note that some eye-tracking systems can use visible light or high-intensity light, depending on the desired configuration of the eye-tracking system.

In some embodiments, the light sources can be aimed at specific portions of the eye area. For example, the light sources 502A-B are aimed at an upper portion and a lower portion of the eye, respectively, near the inside corner 508 of the eye. In other cases, a single light source can be directed at the whole eye area or at a part of the eye area, such as, for example, at one eyelid or at the center of the eye. As another example, several light sources can each aim at respective various points on the eye area, illuminating the eye at each of the various points. Light sources can also differ in the amount of the eye area to which they provide light (termed a spot size). For example, one light source can have a spot size that provides light to the entire eye area, and another light source can focus on a relatively small point on the eye. Further, the shape of the illuminated area can influence the behavior of the system. For example, if a light source illuminates a narrow horizontal area across the top of the eye area, the amount of reflected light can depend on whether the upper eyelid covers that particular height. As another example, a light source that provides light to the entire eye area can allow a system to detect the difference between a completely closed eye and an eye that is almost completely closed.

In addition, a light source can use modulated or pulsed light to distinguish that light source from other light sources and from ambient light. In particular, each light source can be configured to pulse at a particular pattern so that the sensor can determine which light source sent the light based on the on/off pattern of the light. Because ambient light may not follow any such pattern, the light from the system's light sources can be distinguished from ambient-light noise by processing the measured light signal. Note that other light characteristics can be used to distinguish between light sources and/or ambient light. Examples of such light characteristics include frequency (color) and intensity of the light.

In some implementations, in an HMD that uses a light source, the light source can include a structured light scanner. The structured light scanner can be configured both to project light onto one or more surfaces, and to detect the light projection at the one or more surfaces. Of course, in some implementations, the structured light scanner can perform one of these functions, and another device or set of devices can perform the other function. When the HMD is worn, the structured light scanner can be aimed at a wearer's eye area. Accordingly, the structured light scanner can project light onto part or all of the eye area. In addition, the structured light scanner can detect the projected light, and based on the deformation of the detected light relative to the projected light, for example, the scanner can calculate information related to the shape of part or all of the eye area. The information can be calculated on a real-time basis. Accordingly, as the wearer's eye shape changes, the real-time information can be used to detect eye gestures.

The HMD need not include a structured light scanner for carrying out structured light scanning; instead, the HMD can include another device or set of devices configured to carry out structured light scanning, whether that device or set of devices is known or has yet to be developed. In addition, the structured light scanning can be performed with respect to light that is not visible to the human eye (such as, for example, infrared light) or with respect to light that is visible to the human eye. In addition, an HMD can include multiple light scanners, for example, to scan areas at and around both of the wearer's eyes. In a different configuration, an HMD can include a single light scanner that is configured to scan areas at and around both of the wearer's eyes.

Further, the light sources can include elements that allow the system to dynamically change the generated light's frequency, intensity, spot size, shape, focus, or combinations of these properties, among other types of properties. In addition, the light sources can couple with one or more mechanical actuators or servos to facilitate changing the light source's position, light direction, or both. In this way, the system can allow for dynamic calibration and adjustments of the light sources.

The eye-tracking system 500 also includes a light sensor 506 that is configured to detect light reflected from the eye area 504. As used in this disclosure, the term "reflected" can refer to a variety of interactions between light and an eye area, including those interactions that direct the light toward a light sensor. Examples of such interactions include mirror reflection, diffuse reflection, and refraction, among other scattering processes. The sensor can be any type of light-sensitive element or device that is capable of outputting a measurable change in response to changes in light intensity. For instance, the sensor can be a photodiode, an electro-optical sensor, a fiber-optic sensor, or a photo-detector, among other examples. Further, the sensor can be configured to detect a specified frequency of light or a specified range of frequencies. In some implementations, the sensitivity of the sensor can be designed for specified frequencies and intensities of light.

The sensor can be positioned to detect light reflected from particular portions of the eye area. For example, the sensor can be positioned above the eye to detect light reflecting from the top of the eye when the eye is open, and from the upper eyelid when the eye is closed. In this way, the sensor can detect the amount of the eye that the upper eyelid covers. In some embodiments, the light sensor can be aligned at an oblique angle with respect to the eye area. In other arrangements, the sensor can point directly at the eye area and can be aimed toward the center of the eye area.

In some arrangements, the system can detect light reflected from a second eye area. For example, the system can receive light data from another light sensor, which can detect light from a user's other eye area. Alternatively, one light sensor can be positioned to detect light from both eye areas.

In addition, the system can adjust and calibrate the behavior of the sensor, for example, by changing the sensor's position, direction, frequency response, sensitivity, detectable area size or shape, or combinations of these, among others. This can be performed based on the context in which the system is used—for example, whether the system is calibrated to a particular user, an intensity of ambient light, the light sources used, a battery level of the device, or the like. For example, the sensor can be coupled to mechanical actuators for changing its position and direction. As another example, the sensor can include changeable filters and baffles for filtering out different frequencies of light.

A sensor that detects light from multiple sources can differentiate between the signals from each light source. For example, if the system uses a different pulsing pattern for each light source, then the sensor can separate signals based on the detected pulsing characteristics of detected light. Additionally, the light sources can alternate when they illuminate the eye area. In such an arrangement, the sensor can associate a measurement of light with a source based on which source was on at the time that the light was measured. If the light sources illuminate different sections of the eye area, then the separate signals can be further associated with the respective eye-area portions. In other arrangements, the sensor can measure a single light intensity based on light from all the sources, without differentiating between the sources.

B. Other Eye-Tracking Systems

Other eye-tracking systems may be used to detect a wink. For instance, other eye-tracking systems can include one or more cameras configured to capture video or still images of an eye area. Based on the captured video or still images, a system can recognize movements of the eye and eye area and, in particular, can detect winks.

Further, some embodiments may include wink-detection systems that are specifically designed to detect winks, and may or may not be capable of more general eye-tracking functionality. For example, a wink-detection system might include mechanical sensors to detect the motion of a user's eyelids and, from the detected motion, determine that the user is winking. As an example, a wink-detection system could be equipped with an electromyogram or a similar device that is configured to evaluate electrical activity that is produced by skeletal muscles at the wearer's eye area of interest; such a device can be used, in essence, to "hear" movements of muscles at the eye area. As another example, a wink-detection system could be equipped with a vibration detector that is configured to detect relatively subtle vibrations at the wearer's eye area of interest. This disclosure is not limited to the wink-detection systems discussed above; this disclosure contemplates any wink-detection system that is known or has yet to be developed.

In addition, although examples of eye-tracking and wink-detection systems are discussed above in the context of detecting winks, each of the systems discussed above can be configured more generally to function as an eye-gesture detection system that is configured to detect not only wink gestures, but also other eye gestures, such as a squint or a blink.

In some implementations, an eye-tracking or wink-detection system can be integrated in or with a computing system, such as the wearable computing systems discussed above in connection with FIGS. 1A-1G. In these implementations, the wearable computing systems can help a user to interface with the wink-detection system, for instance, to specify user preferences, change system settings, perform calibration processes, or perform any combination of these functions, among other functions.

VII. Conclusion

It should be understood that the examples described wither reference to an HMD are not limited to an HMD. It is contemplated that the example methods and systems described with reference to an HMD may be implemented on other types of computing devices, such as mobile phones, tablet computers, and/or laptop computers, for instance.

More generally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:
1. A computing device comprising:
an image-capture device comprising at least one image sensor; and
a control system configured to:
while the computing device is powered on and the at least one image sensor is powered off: (a) receive sensor data from one or more sensors, and (b) analyze the sensor data to detect at least one pre-image-capture signal that indicates a subsequent image-capture signal is likely to be received, wherein the at least one pre-image-capture signal comprises sensor data that corresponds to fixation on a location in an environment of the computing device; and
in response to detection of the at least one pre-image-capture signal, initiate an image-capture preparation process that: (a) puts the image-capture device in an image-ready state by at least powering on the at least one image sensor, and (b) provides no explicit visual indication that the image-capture device is in the image-ready state.

2. The computing device of claim 1, wherein the computing device is implemented as part of or takes the form of a head-mountable device (HMD).

3. The computing device of claim 1, wherein the control system is further configured to:
subsequent to the detection of the at least one pre-image-capture signal, and while the image-capture device in an image-ready state, receive an image-capture signal; and
in response to detection of the pre-image-capture signal, cause the image-capture device to capture an image.

4. The computing device of claim 1, wherein the control system is further configured to:
after initiating the image-capture preparation process, cause the image-capture device to remain in the image-ready state until either (a) an image-capture signal is received or (b) a predetermined period of time elapses without receipt of an image-capture signal.

5. The computing device of claim 1, wherein the one or more sensors comprise one or more of: (a) one or more proximity sensors, (b) one or more image-capture devices, (c) one or more microphones, (d) one or more accelerometers, (e) one or more gyroscopes, and (f) one or more magnetometers.

6. The computing device of claim 1, further comprising an eye-tracking system, wherein the one or more sensors are part of an eye-tracking system.

7. The computing device of claim 1, wherein the control system is further configured to:
analyze sensor data to detect a wink signal; and
in response to detection of the wink signal, cause the image-capture device to capture an image.

8. A computing device comprising:
an image-capture device comprising at least one image sensor; and
a control system configured to:
while the computing device is powered on and the at least one image sensor is powered off: (a) receive sensor data from one or more sensors, and (b) analyze the sensor data to detect at least one pre-image-capture signal that indicates a subsequent image-capture signal is likely to be received, wherein at least one pre-image-capture signal comprises sensor data that is indicative of a closed eye; and
in response to detection of the at least one pre-image-capture signal, initiate an image-capture preparation process that: (a) puts the image-capture device in an image-ready state by at least powering on the at least one image sensor, and (b) provides no explicit visual indication that the image-capture device is in the image-ready state.

9. A computing device, wherein the computing device is implemented as part of or takes the form of a head-mountable device (HMD), the computing device comprising: a button interface; one or more proximity sensors that are arranged to detect a hand that is located near to the button interface; the image-capture device comprising at least one or more image sensor; and a control system configured to: while the computing device is powered on and the at least one image sensor is powered off: (a) receive sensor data from one or more sensors, and (b) analyze the sensor data to detect at least one pre-image-capture signal that indicates a subsequent image-capture signal is likely to be received, wherein at least one pre-image-capture signal comprises sensor data that is indicative of a hand within a certain distance from the interface feature and separated by air from the interface feature, wherein the interface feature is usable to initiate the subsequent image-capture signal; and in response to detection of the at least one pre-image-capture signal, initiate an image-capture preparation process that: (a) puts the image-capture device in an image-ready state by at least powering on the at least one image sensor, and (b) provides no explicit visual indication that the image-capture device is in the image-ready state.

10. The computing device of claim 1, wherein the at least one pre-image-capture signal comprises a first voice command, wherein the control system is further configured to:
respond to the first voice command by causing the computing device to operate in an image-capture mode; and
while the computing device is operating in the image-capture mode, respond to a second voice command by causing the image-capture device to capture an image.

11. A computer-implemented method comprising:
receiving sensor data from one or more sensors associated with a computing device, wherein the computing device comprises an image-capture device having at least one image sensor, wherein the sensor data is received while the computing device is powered on and the at least one image sensor is powered off;
analyzing the sensor data to detect at least one pre-image-capture signal, wherein the at least one pre-image-capture signal indicates a subsequent image-capture signal is likely to be received, wherein analyzing the sensor data to detect the at least one pre-image-capture signal comprises at least one of (a) detecting sensor data that corresponds to fixation on a location in an environment of the computing device comprises, (b) detecting sensor data that is indicative of a closed eye, or (c) detecting sensor data that is indicative of a hand within a certain distance from an interface feature and separated by air from the interface feature, wherein the interface feature is usable to initiate the subsequent image-capture signal; and
in response to detecting the at least one pre-image-capture signal, causing the computing device to initiate an image-capture preparation process that: (a) puts the image-capture device in an image-ready state by at least powering on the at least one image sensor, and (b) provides no explicit visual indication that the image-capture device is in the image-ready state.

12. The method of claim 11, wherein analyzing the sensor data to detect the at least one pre-image-capture signal comprises detecting sensor data that corresponds to fixation on a location in an environment of the computing device.

13. The method of claim 11, wherein analyzing the sensor data to detect the at least one pre-image-capture signal comprises detecting sensor data that is indicative of a closed eye, wherein the computing device is configured to capture an image in response to detection of a wink signal.

14. The method of claim 11, wherein analyzing the sensor data to detect the at least one pre-image-capture signal comprises detecting sensor data that is indicative of a hand within a certain distance from an interface feature, wherein the interface feature is usable to initiate the subsequent image-capture signal.

15. The method of claim 11, wherein analyzing the sensor data to detect the at least one pre-image-capture signal comprises detecting sensor data that is indicative of a first voice command, wherein the computing device is configured to: (a) respond to the first voice command by causing the computing device to operate in an image-capture mode and (b) while operating in the image-capture mode, respond to a second voice command by causing the image-capture device to capture an image.

16. A non-transitory computer readable medium having stored therein instructions executable by a computing device to cause the computing device to perform functions comprising:
receiving sensor data from one or more sensors associated with a computing device, wherein the computing device comprises an image-capture device having at least one image sensor, wherein the sensor data is received while the computing device is powered on and the at least one image sensor is powered off;
analyzing the sensor data to detect at least one pre-image-capture signal, wherein the at least one pre-image-capture signal indicates a subsequent image-capture signal is likely to be received, wherein analyzing the sensor data to detect the at least one pre-image-capture signal comprises at least one of (a) detecting sensor data that corresponds to fixation on a location in an environment of the computing device comprises, (b) detecting sensor data that is indicative of a closed eye, or (c) detecting sensor data that is indicative of a hand within a certain distance from an interface feature and separated by air from the interface feature, wherein the interface feature is usable to initiate the subsequent image-capture signal; and
in response to detecting the at least one pre-image-capture signal, causing the computing device to initiate an image-capture preparation process that: (a) puts the image-capture device in an image-ready state by at least powering on the at least one image sensor, and (b) provides no explicit visual indication that the image-capture device is in the image-ready state.

17. The non-transitory computer readable medium of claim 16, wherein analyzing the sensor data to detect the at least one pre-image-capture signal comprises detecting sensor data that is indicative of a closed eye, wherein the computing device is configured to capture an image in response to detection of a wink signal.

18. The non-transitory computer readable medium of claim 16, wherein analyzing the sensor data to detect the at least one pre-image-capture signal comprises detecting sensor data that is indicative of a first voice command, wherein the computing device is configured to: (a) respond to the first voice command by causing the computing device to operate in an image-capture mode and (b) while operating in the image-capture mode, respond to a second voice command by causing the image-capture device to capture an image.

* * * * *

UNITED STATES PATENT AND TRADEMARK OFFICE
CERTIFICATE OF CORRECTION

| | |
|---|---|
| PATENT NO. | : 9,223,136 B1 |
| APPLICATION NO. | : 13/758888 |
| DATED | : December 29, 2015 |
| INVENTOR(S) | : Max Benjamin Braun, Peter Malkin and Sergey Brin |

It is certified that error appears in the above-identified patent and that said Letters Patent is hereby corrected as shown below:

At title page, item (72) Inventors,
please delete "Peter Kenneth Malkin" and replace with -- Peter Malkin --

Signed and Sealed this
Sixteenth Day of August, 2016

Michelle K. Lee
*Director of the United States Patent and Trademark Office*